Figure 6:
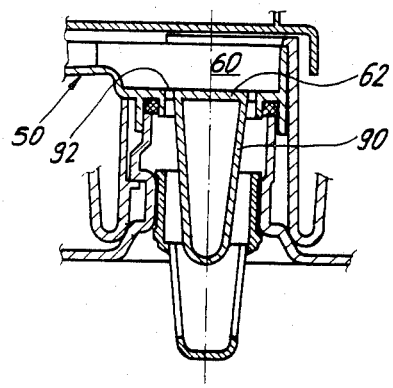

United States Patent [19]

Alhäuser

[11] Patent Number: 4,684,461

[45] Date of Patent: Aug. 4, 1987

[54] APPARATUS FOR THE TREATMENT, IN PARTICULAR SOFTENING AND/OR COMPLETE DESALINATION OF WATER

[76] Inventor: Erich Alhäuser, Am Hölzeberg 2, Ransbach-Baumbach, Fed. Rep. of Germany

[21] Appl. No.: 824,092

[22] Filed: Jan. 30, 1986

[30] Foreign Application Priority Data

Feb. 5, 1985 [DE] Fed. Rep. of Germany ....... 3503768

[51] Int. Cl.$^4$ .................................................. C02F 1/42
[52] U.S. Cl. .................................. 210/96.1; 210/282; 210/350
[58] Field of Search ................. 210/86, 91, 96.1, 190, 210/191, 232, 234, 235, 238, 282, 287, 350–352, 483

[56] References Cited

U.S. PATENT DOCUMENTS 3,252,578  5/1966  Smith et al. ......................... 210/282
3,342,340  9/1967  Shindell ............................. 210/282
4,332,678  6/1982  Spiegl ................................. 210/190

Primary Examiner—Ivars Cintins
Attorney, Agent, or Firm—Larson and Taylor

[57] ABSTRACT

An apparatus for the treatment, in particular softening and/or completed desalination of throughflowing water, consisting of a wall bracket (10) and a cartridge (12) which can be held by this bracket in an upright position, being filled with a treatment compound. The cartridge has a bottom connection aperture for supplying the water to be treated and a top connection aperture for an open-ended drainage line, which in accordance with the invention is formed at least partially by a channel (52, 56, 60, 80) within the wall bracket (10). The wall bracket (10) has in addition a mechanical fixture and a sealing assembly (44, 76) for suspended fixture of the cartridge (12) by its upper end and for the seal-tight connection of the upper connection aperture with the channel (52, 56, 60, 80) in the wall bracket (10). Cartridge replacement is considerably simplified thereby.

12 Claims, 8 Drawing Figures

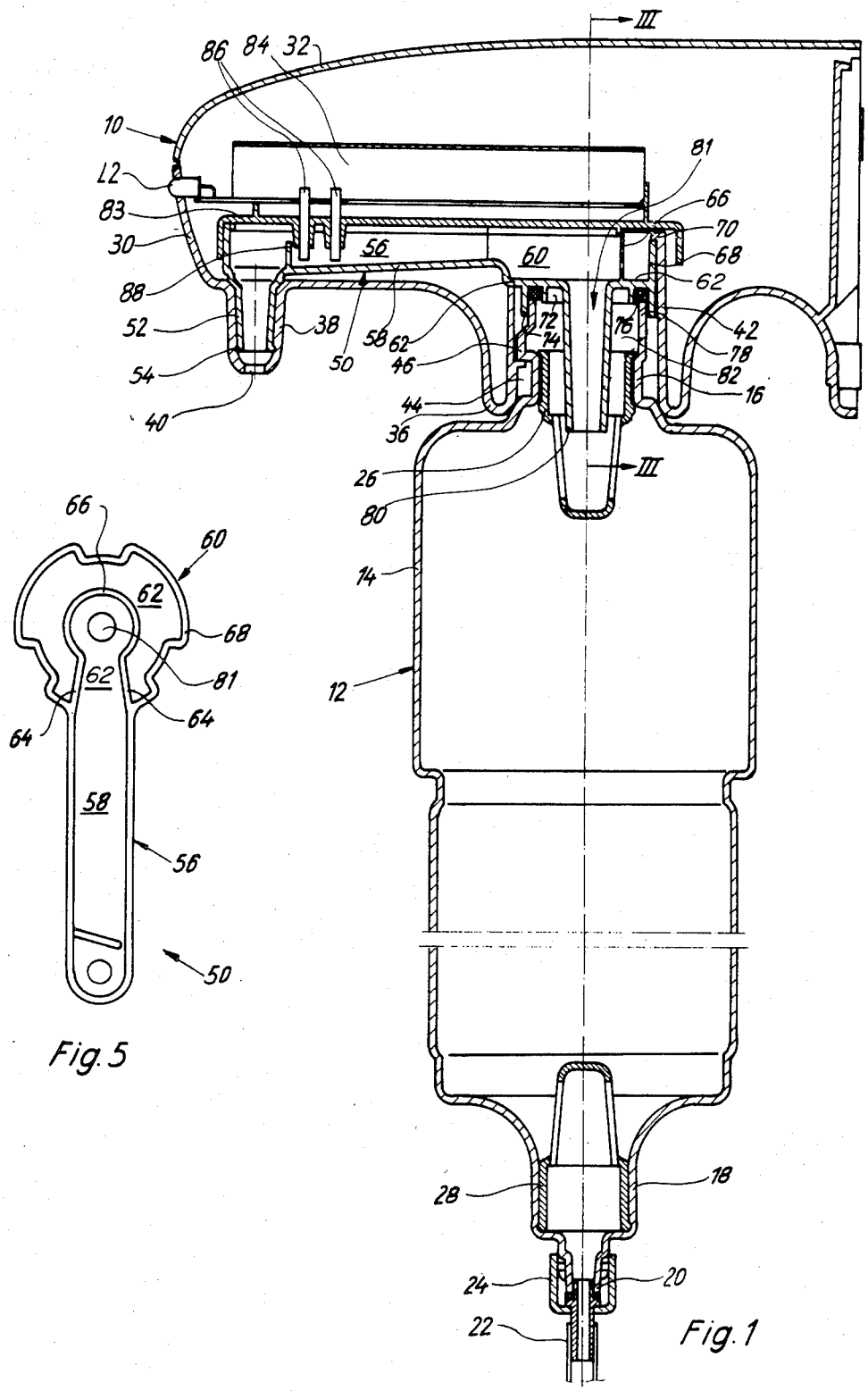

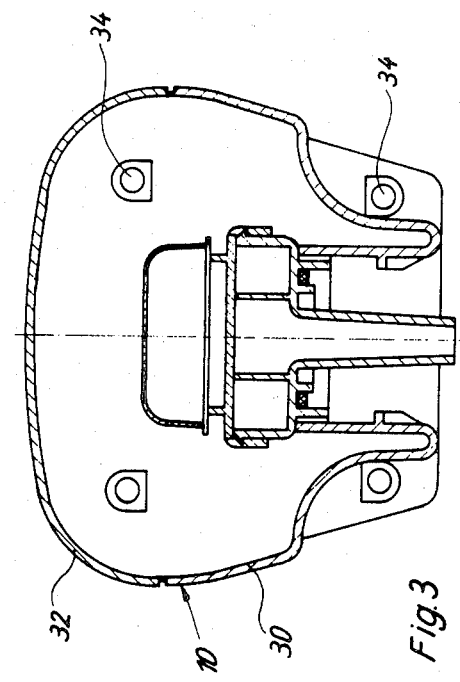
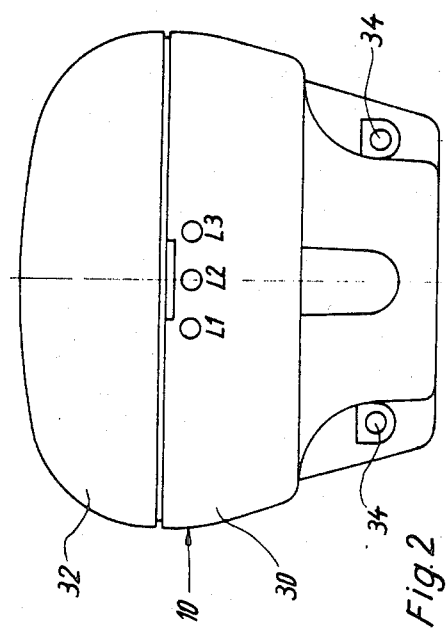
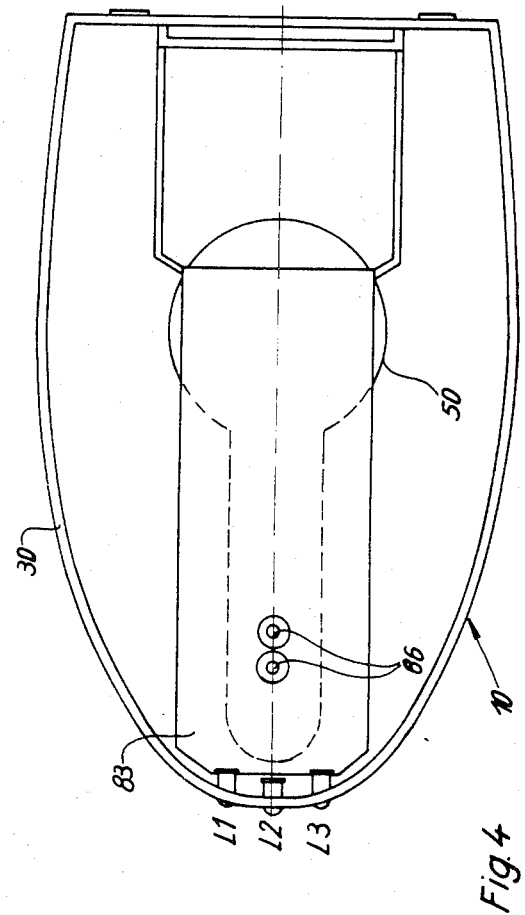

APPARATUS FOR THE TREATMENT, IN PARTICULAR SOFTENING AND/OR COMPLETE DESALINATION OF WATER

DESCRIPTION

The invention is concerned with an apparatus for the treatment, in particular softening and/or complete desalination of throughflowing water, consisting of a wall bracket and a cartridge which can be held by this bracket in an upright position, being filled with a treatment compound, having a bottom connection aperture for supplying the water to be treated and a top connection aperture for an open-ended drainage line.

Such an apparatus is known from the DE-OS No. 28 23 432.

In the apparatus already known, which is foreseen for use as a filtering device for example in motor-vehicle workshops, by chemical laboratories, chemists etc., for making purified water available as required, a special connection nozzle is attached to the connection aperture of the cartridge before or after insertion in the bracket, which bears a laminated filter on its end piece protruding into the cartridge and a conductance meter on its outer end. A drainage line is connected to the connection nozzle in the form of an open-ended hose, out of which the treated water comes when the inlet to the cartridge above the bottom connection is opened. For this reason, when changing cartridges, apart from disconnecting and reconnecting the supply line on the bottom cartridge connection, and removing the cartridge from the bracket and replacing a new cartridge in the same, the connection point on the top connection must also be removed and inserted in the new cartridge. This is complicated and time-consuming and requires, in particular, high proficiency if the conductance meter contained in the connection nozzle is fed from the mains via a cable. If the plug is pulled out of the plug socket for this purpose, the danger exists that the re-insertion of the plug is overlooked and thus monitoring of the conductance is inadvertently omitted.

The basic objective of the invention is thus to design an apparatus as a further development of the type described initially so that cartridge-changing is considerably simplified and which ensures a constant supervision of the conductance when using a conductance meter connectable to the mains.

In accordance with the invention this objective is solved in that the drainage line is formed at least partially of a channel within the wall bracket and the wall bracket has a mechanical fixture and sealing assembly for suspended fixture of the cartridge by its upper end and for the seal-tight connection of the connection aperture with the channel in the wall bracket.

It is evident that in the case of the apparatus in accordance with the invention that apart from disconnecting and reconnecting the supply line only the cartridge has to be removed from the wall bracket and a new cartridge attached to this, whereby the drainage line is automatically removed from the cartridge or re-connected with it.

In accordance with a first characteristic for the advantageous design of the invention the wall bracket is designed as a housing type of component which extends mainly above and beyond the cartridge and has a mainly horizontal channel section, connecting with the fixture and sealing assembly, which leads to a drainage nozzle pointing downwards. Such a wall bracket is especially suitable for manufacture in plastic and is thus not only cheap to manufacture but also resistant against corrosion and is easy to keep clean. Furthermore, this type of wall bracket allows the mainly horizontal channel section to be designed effortlessly so that it is slightly inclined towards the connection nozzle, in order to prevent the treated water becoming stationary, undesirably, in this section.

The aforementioned design of the apparatus in accordance with the invention has the further advantage in conjunction with a conductance metering device in the drainage line that the conductance metering device can be arranged in a simple manner inside the housing type component and can protrude into the mainly horizontal channel section with its electrode or its electrodes, whereby it is additionally practical to fit the mainly horizontal channel section downstream from the electrode or from the electrodes with a damming element which provides for sufficient rinsing of the electrode or electrodes when the water is flowing downwards.

In accordance with another characteristic of the advantageous design of the invention the fixture and sealing assembly is formed by the elements of a screw and bayonet fastening and a ring gasket, against which the upper aperture edge of the cartridge creates a sealing contact. Such a screw or bayonet fastening is simple and quick to handle and yet offers the guarantee of a secure fixture and sealing of the cartridge in operation.

Yet another design characteristic of the invention provides that the channel forming the drainage line has a flanged socket penetrating through the top connection aperture into the cartridge having a considerably lesser outer diameter than the inner width of the connection aperture for the cartridge, thus forming a ring-shaped air-cushion between its outside and the cartridge wall.

This air-cushion prevents the water which continues to flow out of the wall bracket when the cartridge is removed from the wall bracket from flowing over the edge of the top cartridge aperture.

The aforementioned form of the invention can be designed further still to advantage in that a helical coil compression spring can be firmly fixed to enclose the flanged socket on the wall bracket, from which a load can be applied to a thrust piston which is slidable inside the cartridge for the purpose of compensating the operational changes in volume of the treatment compound. This piston can either be designed as a ring piston guided along the pipe connection being secured by a collar on the flanged socket's bottom end, or as a disk piston which remains inside the cartridge when the cartridge is changed. Thereby costs are lowered considerably compared with cartridges containing helical compression springs, which should be made of stainless steel with regard to resistance to corrosion.

In place of the flanged socket forming the ring-shaped air-cushion, in accordance with an alternative design characteristic of the invention, a displacement body which penetrates into the cartridge having a lesser cross-section than the top connection aperture of the cartridge can also be arranged on the wall bracket within the fixture and sealing assembly, which provides a sufficient volume inside the top end of the cartridge for the accomodation of the water continuing to flow out of the wall bracket when the cartridge is removed from tha wall bracket.

Figure 7:
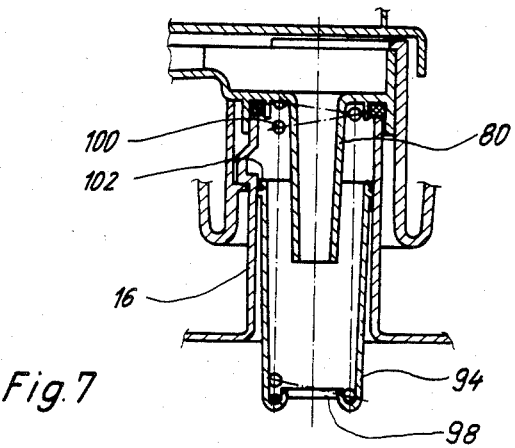
Figure 8:
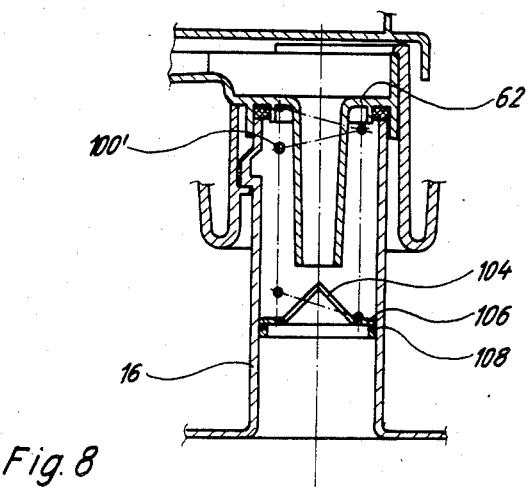

The invention is explained in more detail below with reference to the drawings wherein:

FIG. 1 is a vertical section through an apparatus designed in accordance with the invention for the treatment of throughflowing water, FIG. 2 is a frontal view of the wall bracket for the apparatus in accordance with FIG. 1, FIG. 3 is a cross-section through the wall bracket along line III—III in FIG. 1, FIG. 4 is a plan view of the wall bracket with the cover removed, FIG. 5 is a plan view of the wall bracket's channel insert, FIG. 6 is a cut-out of FIG. 1 with a modified version of the apparatus in the region of the cartridge connection onto the wall bracket, FIG. 7 is the same drawing cut-out as in FIG. 6 with a further modification compared with FIG. 1, and FIG. 8 is the same drawing cut-out as in FIG. 6 with yet another modification compared with FIG. 1.

The apparatus illustrated in total in FIG. 1 consists of two main parts, namely a wall bracket 10 and a replaceable cartridge 12 which is inserted and held in this bracket.

The cartridge 12 has a principally cylindrical housing 14 which tapers to an open-ended neck part 16 at the top end and to a neck part 18 with a hose connection 20 at the bottom end. A hose 22 with a coupling component 24 for supplying the water to be treated is connected to the hose connection 20 so as to be disconnectable.

The cartridge 12 is filled with a treatment compound such as for example ion exchange resin, this not being illustrated. Pressed-in filter bushings 26, 28 in the neck part 16, 18 prevent the treatment compound from escaping through the cartridge apertures.

The wall bracket 10 consists of a housing preferably fabricated of plastic with a bottom part 30 and a removable top part or cover 32. The bottom part 30 has holes on its rear side for fixing to the wall, through which fixing screws can be put when the cover is off (not shown).

Whilst the housing cover 32 has a smooth, arched shape, the housing's bottom part has larger, collar shaped neck 36 nearer to its rear side on the bottom face and a smaller, collar-shaped neck 38 in the vicinity of the housing's front end. The smaller neck 38 is shaped slightly conically and has an aperture 40 on its semispherically shaped end. The larger collar-shaped neck 36 is designed with double-walls and accomodates the top neck part 16 of cartridge 12 with its upwards extending inner cylindrical wall part 42, when this is inserted in the wall bracket 10. Radially inward pointing projection 44 on the inner wall 42 of the collar-shaped neck 36 serve the purpose of holding the cartridge 12 in the collar-shaped neck 36, which form a bayonet fastening of basically known form together with radially outward pointing projections 46 on the top neck part 16 of the cartridge 12.

A channel section 50 is inserted in the housing's bottom part 30, whose form can be seen from FIG. 5 in conjunction with FIG. 1. The channel insert 50 has a nozzle-shaped neck 52, which penetrates flush into the collar-shaped neck 38 of the housing's bottom 30 and engages in an annular groove in the collar-shaped neck 38 with a ring-shaped thickening 54 at the bottom end. A gutter element 56 leads from the nozzle-shaped neck 52 of the channel insert 50, the former having a base wall 58 inclined slightly upwards to an end part 60 with a horizontal wall 62 located lower than that end of the base wall 58 upon which the lateral walls 64 of the gutter element 56 continue, at first converging and then ending in an inner ring wall 66.

The horizontal wall 62 of the end part 60 on the channel insert 50 is designed considerably larger then just the area thereof enclosed by the inner ring wall 66 and is bounded at its irregularly shaped outer circumference by an outer ring wall 68 adjoining onto the lateral walls of the gutter element 58, the top edge of outer wall 68 engaging onto the housing's bottom part 30 behind a beading-shaped thickening 70 at the top end of the inner cylindrical wall 42 of the collar-shaped neck 36. The cylindrical wall 42 ends for this purpose on the largest part of its circumference above the channel insert 50 and comprises only at this point, where the gutter-shaped channel element 56 extends upwards, a recess for the same.

The horizontal wall 62 of the end part 60 bears two concentric annular collars 72, 74 on its bottom face for the accomodation of a ring gasket 76, against which the top edge 78 of the neck part 16 of cartridge 12 presses seal-tight with the aid of the cartridge's bayonet fastening type of connection with the wall part. It is evident that a threaded connection can be foreseen instead of the bayonet fastening type of connection.

The horizontal wall 62 comprises in addition an aperture 81 enclosed by a flanged socket 80 within the ring wall 66. The flanged socket 80 extends in the case of the illustrated example above the bottom edge of the collar-shaped neck 36 on the housing's bottom part 30 downwards and penetrates far into its neck part 16 when the cartridge 12 is inserted. Thus an annular space 82, closed at the top, is created in the neck part 16 of the cartridge 12 which is inserted in the wall bracket 10, in which space an air-cushion is formed when water flows through the cartridge for a purpose to be described at a later stage.

The channel insert 50 is enclosed by a cover 83 on the top face. The cover 83 serves simultaneously as a support for a conductance metering device 84 known in itself which is illustrated in the example with two electrodes 86 and is otherwise not further illustrated. The electrodes 86 are put through the cover 83 and penetrate into the gutter-shaped channel part 56, in order to be rinsed by the treated water passing through when water is tapped off. In order to create a sufficient water height in the gutter-element 56 for this purpose even when the water take-off is extremely restricted, the channel element 56 contains a damming element 88, in the shape of a cross-wall coming out from the side wall 64 and ending at a distance from the other lateral wall, this element extending down to the base wall 58 of the channel element 56, downstream from the electrodes 86.

The conductance metering device is operated in the known manner from a battery or the mains at the location of the apparatus via a cable (not shown), which comes out of the wall bracket at a suitable point and is fitted with a plug for plugging into a plug-socket. In order to make the conductance value measured recognizable three light emitting diodes L1, L2, L3, as can be seen in FIG. 1 and 2, which display the various conductance statuses such as <5uS, <20uS and >20uS (="change cartridge") can be arranged, for example, on the face ends of the housing's bottom 30.

The method of operation of the apparatus which is illustrated and described requires no special explanation. When the cartridge 12 has filled itself with water via the hose 22 upon initial opening of the water supply and this has risen through the flanged socket 80 into the end part 60 of the channel insert 50, the water treated in the cartridge flows automatically to the outlet of the apparatus formed by the collar-shaped neck 38 and the nozzle-shaped neck 52 as a consequence of the inclined position of the base wall 58, where it is collected in a vessel or the like by the operator. It is obvious that a hose for the transfer of the treated water can also be connected to this outlet. If the water supply is turned off water will continue to flow until the water in the end part 60 has sunken down to the height of the adjoining base wall 58 of the gutter element 56. If the third diode L3 now lights up and displays a conductance value of >20uS, this means that the ion exchange capacity of the resin in the cartridge 12 is exhausted and that the cartridge has to be replaced. For this purpose it is sufficient to turn the cartridge 12 by a slight angle to release the bayonet fastening and to pull out the cartridge 12 from the wall bracket 10 downwards. At this juncture the cartridge is placed over a sink or other vessel whilst maintaining its upright position and the coupling piece 24 of hose 22 removed from the hose connection 20, whereby the water contained in the cartridge flows out into the sink or vessel.

When the cartridge 12 is pulled out of the wall bracket 10 the water contained in the flanged socket and the end part 60 above the neck part 16 continues to flow through the flanged socket. However, this quantity of water does not lead to the cartridge overflowing because a sufficient take-up volume is available inside the cartridge for this quantity of water by means of the above mentioned air-cushion.

The connection and insertion of a new cartridge in the wall bracket takes place in the reverse order.

FIG. 6 shows a modified version of the method of prevention of the cartridge overflowing when removing from the wall bracket. Instead of the air-cushion forming the take-up volume for the quantity of water continuing to flow in the annular space 82 as in the previously described form of the version, in the case of the version in the form in accordance with FIG. 6 the base wall 62 of the end part 60 on the channel insert 50 is closed in the center and fitted with a dowel-shaped displacement body 90, around which a rim to aperture 92 is arranged in the base wall 62. It is evident that the displacement body 90 has the same effect as the air-cushion 82 and creates a sufficient take-up volume in the neck part 16 of the cartridge 12 for the water continuing to flow when removed from the wall bracket 10.

The design of the fixture and sealing assembly of the cartridge 12 in the wall bracket 10 in accordance with the invention allows an effective adaptation by a simple means of the accomodation volume of the cartridge to the exchange compound contained in it, which shrinks after long use and thus reduces in volume. For this purpose spring-loaded pistons have been employed in the examples of versions according to FIGS. 7 and 8 instead of the filter bushings 26 in the previous examples of versions, the former exerting pressure on the treatment compound (not shown) in the cartridge from above, whereby at least the helical compression spring used for this, which must be made of stainless steel or another corrosion resistant material and hense is expensive, is a component part cf the converter.

In the example of the version in accordance with FIG. 7 the aforementioned piston is designed as a cupped piston 94, whose base is designed as a filter. A helical coil compression spring 100 affixed in a manner as desired to the bottom face of the horizontal wall 62 of the end part 60 on the channel insert 50 engages in an annular groove 98 on the piston's base and presses the cupped piston 94, which is guided seal-tight by a ring gasket 102 in the cartridge's neck, against the treatment material (not shown) inside the cartridge 12.

In the case of the version in the form in accordance with FIG. 8 the ring piston 94 has been replaced by a disk piston 106 provided with slots, which is guided by a ring gasket 108 seal-tight in the cartridge's neck 106. A helical coil compression spring 100', which is fixed in a suitable manner by its top end onto the horizontal wall 62 designed otherwise as in the examples of the versions in accordance with FIGS. 1 through 5, grips the top face of the disk piston 106 when the cartridge is inserted into the wall bracket and presses this downwards onto the treatment compound (not shown) in the cartridge.

What I claim is:

1. An apparatus for the treatment of flow through water comprising:
   a wall bracket,
   a cartridge containing a treatment material for treating the water, and through which the water flows,
   means for mounting the cartridge on the wall bracket with the cartridge in an upright position,
   said cartridge having a bottom connection aperture for supplying water to the cartridge and a top connection aperture for delivering the water out of the cartridge, an open ended drainage line located within the wall bracket, in open communication with said top connection aperture at one end thereof, and having a drainage outlet spout at the other end thereof, and
   a fixing and sealing assembly means for connecting said top connecting aperture of the cartriage to the wall bracket with the cartridge suspended downwardly therefrom, and with said top connection aperture in fluid tight engagement with said wall bracket so as to provide a continuous drainage channel from said cartridge through said top connection aperture, through said open drainage line and to said outlet spout.

2. An apparatus according to claim 1, said wall bracket being a housing which extends above said top connection aperture and outwardly therefrom in a direction outwardly from the portion of the wall bracket which would connect with a wall, said wall bracket housing having a channel extending essentially horizontally therein and constituting said open ended drainage line, which channel section connects with said fixing and sealing assembly means at one end and with said outlet spout at its other end.

3. An apparatus according to claim 2, said wall bracket housing being made of plastic.

4. An apparatus according to claim 2, said essentially horizontal channel section being slightly inclined upwardly toward said top connection aperture.

5. An apparatus according to claim 4, including a conductance metering device mounted with said wall bracket housing and having protrusions in the form of electrodes extending into said essentially horizontal channel section.

6. An apparatus according to claim 5, said essentially horizontal channel section having a damming element located between said electrodes and said outlet spout.

7. An apparatus according to claim 1, said fixing and sealing assembly means comprising a screw and bayonet fastening structure, and including a ring gasket mounted in the wall bracket housing so as to engage the upper end of the top connection aperture of the cartridge to form said fluid type engagement.

8. An apparatus according to claim 1, said open ended drainage line including a flanged socket extending down through said top connection aperture into the cartridge, said socket having a smaller outside diameter than the inside diameter of the top connection aperture of the cartridge to form a space therebetween, the top of the top connection aperture and the wall bracket forming a fluid tight seal such that said space between the socket and the inside of the top connection aperture forms an annular air-cushion.

9. An apparatus according to claim 8, including a helical compression spring firmly fixed to the said flange socket, and including a thrust piston having at least a portion located below said flange socket and being slidable within the top connection aperture of the cartridge and urged downwardly by said spring to thereby compensate for operational changes in the volume of the treatment material.

10. An apparatus according to claim 9, wherein the thrust piston is in the shape of a cupped piston.

11. An apparatus according to claim 9, wherein the thrust piston is in the shape of a disk.

12. An apparatus according to claim 1, including a fixed displacement body extending from said open ended drainage line down into the top connection aperture and into the cartridge, said body having a smaller outside diameter than the inside diameter of said top connection aperture, to thereby form a void which is taken up by liquid within the cartridge as the cartridge is separated from the wall bracket.

* * * * *